(12) United States Patent
Pinna et al.

(10) Patent No.: US 12,633,951 B2
(45) Date of Patent: May 19, 2026

(54) SENSOR SIGNAL MULTIPLEXER AND DIGITIZER WITH ANALOG NOTCH FILTER AND OPTIMIZED SAMPLE FREQUENCY

(71) Applicant: INVENSENSE, INC., San Jose, CA (US)

(72) Inventors: Carlo Pinna, Milan (IT); Federico Mazzarella, Milan (IT); Daniele Gardino, Milan (IT); Cristiano Rocco Marra, Milan (IT); Francesco Lazzarini, Milan (IT)

(73) Assignee: INVENSENSE, INC., San Jose, CA (US)

( * ) Notice: Subject to any disclaimer, the term of this patent is extended or adjusted under 35 U.S.C. 154(b) by 910 days.

(21) Appl. No.: 17/654,325

(22) Filed: Mar. 10, 2022

(65) Prior Publication Data

US 2023/0032538 A1 Feb. 2, 2023

Related U.S. Application Data

(60) Provisional application No. 63/228,206, filed on Aug. 2, 2021.

(51) Int. Cl.
*H04B 1/10* (2006.01)
*H04B 1/00* (2006.01)

(52) U.S. Cl.
CPC ......... *H04B 1/1036* (2013.01); *H04B 1/0057* (2013.01); *H04B 2001/1063* (2013.01)

(58) Field of Classification Search
CPC ................ H04B 1/1036; H04B 1/0057; H04B 2001/1063
See application file for complete search history.

(56) References Cited

U.S. PATENT DOCUMENTS

| | | | | | |
|---|---|---|---|---|---|
| 4,246,655 | A | * | 1/1981 | Parker | H04B 7/082 |
| | | | | | 455/135 |
| RE31,750 | E | * | 11/1984 | Morrow | G07C 3/00 |
| | | | | | 73/659 |
| 5,381,442 | A | * | 1/1995 | Brown | G01B 15/02 |
| | | | | | 374/7 |
| 6,477,465 | B1 | * | 11/2002 | McCall | G01C 21/188 |
| | | | | | 73/178 R |

(Continued)

OTHER PUBLICATIONS

Tsinker et al., "Round Robin Sensor Device for Processing Sensor Data," U.S. Appl. No. 17/680,637, filed Feb. 25, 2022, 21 pages.

*Primary Examiner* — Jinsong Hu
*Assistant Examiner* — Rui M Hu
(74) *Attorney, Agent, or Firm* — Amin, Turocy & Watson, LLP

(57) ABSTRACT

The described technology is generally directed towards a sensor signal multiplexer and digitizer with analog notch filter and optimized sample frequency, and corresponding methods of use and manufacture. In some examples, the disclosed technologies can be used to reduce vibration sensitivity of an inertial measurement unit (IMU). The disclosed sensor signal multiplexer can sample sensor inputs on multiple input channels at a first, higher frequency, and integrate samples for each channel in order to generate lower frequency sensor outputs. The lower frequency sensor outputs can be converted to digital form.

18 Claims, 6 Drawing Sheets

SENSOR SIGNAL PATH 100

```
MEMS X
101

MEMS Y      MUX     AMP     FILTER    ADC     DEMUX           OUT X 141
102         111     112     120       131     132             OUT Y 142
                                                              OUT Z 143
MEMS Z
103
```

HIGHER FREQUENCY 110          LOWER FREQUENCY 130

(56)  References Cited

U.S. PATENT DOCUMENTS

| | | | | |
|---|---|---|---|---|
| 6,522,992 | B1 * | 2/2003 | McCall | G01C 21/183 |
| | | | | 701/4 |
| 8,290,100 | B2 * | 10/2012 | Komninakis | H04B 1/525 |
| | | | | 324/76.23 |
| 8,299,947 | B2 * | 10/2012 | Pagnanelli | H03M 3/468 |
| | | | | 341/120 |
| 8,599,054 | B2 * | 12/2013 | Carlsson | H03M 3/434 |
| | | | | 341/143 |
| 9,329,042 | B1 * | 5/2016 | Cazzaniga | G01C 19/5776 |
| 9,685,961 | B2 * | 6/2017 | Chu | H03L 7/23 |
| 9,813,137 | B2 * | 11/2017 | Wloczysiak | H04W 40/246 |
| 11,418,890 | B1 * | 8/2022 | Nielsen | H04R 19/04 |
| 11,431,346 | B2 * | 8/2022 | Ha | H03M 1/0621 |
| 2003/0122079 | A1 * | 7/2003 | Pobanz | H10F 39/184 |
| | | | | 250/336.1 |
| 2006/0287824 | A1 * | 12/2006 | Lin | G01C 21/1656 |
| | | | | 701/472 |
| 2007/0291012 | A1 * | 12/2007 | Chang | G06F 3/0445 |
| | | | | 345/173 |

| | | | | |
|---|---|---|---|---|
| 2008/0238750 | A1 * | 10/2008 | Kris | G05B 19/414 |
| | | | | 341/155 |
| 2009/0212867 | A1 * | 8/2009 | Fukuzawa | H03G 5/24 |
| | | | | 330/284 |
| 2010/0132463 | A1 * | 6/2010 | Caminada | G01C 19/5712 |
| | | | | 73/504.12 |
| 2011/0181468 | A1 * | 7/2011 | Sun | G01S 19/21 |
| | | | | 342/357.73 |
| 2014/0260619 | A1 * | 9/2014 | Shaeffer | G01P 1/04 |
| | | | | 73/528 |
| 2015/0176992 | A1 * | 6/2015 | Entringer | G01C 19/567 |
| | | | | 73/504.12 |
| 2015/0249462 | A1 * | 9/2015 | Chang | H03F 1/0277 |
| | | | | 398/43 |
| 2016/0327393 | A1 * | 11/2016 | Shaeffer | G01C 19/5776 |
| 2016/0380660 | A1 * | 12/2016 | Polley | H04B 1/0028 |
| | | | | 375/350 |
| 2019/0005807 | A1 * | 1/2019 | Fujimori | G08C 15/00 |
| 2019/0190535 | A1 * | 6/2019 | Tsinker | H03M 1/124 |
| 2021/0176107 | A1 * | 6/2021 | Hou | H03F 1/3241 |
| 2022/0333957 | A1 * | 10/2022 | Mazzarella | G01D 9/32 |
| 2024/0203711 | A1 * | 6/2024 | Kapoor | H01J 37/32935 |

* cited by examiner

FIG. 4

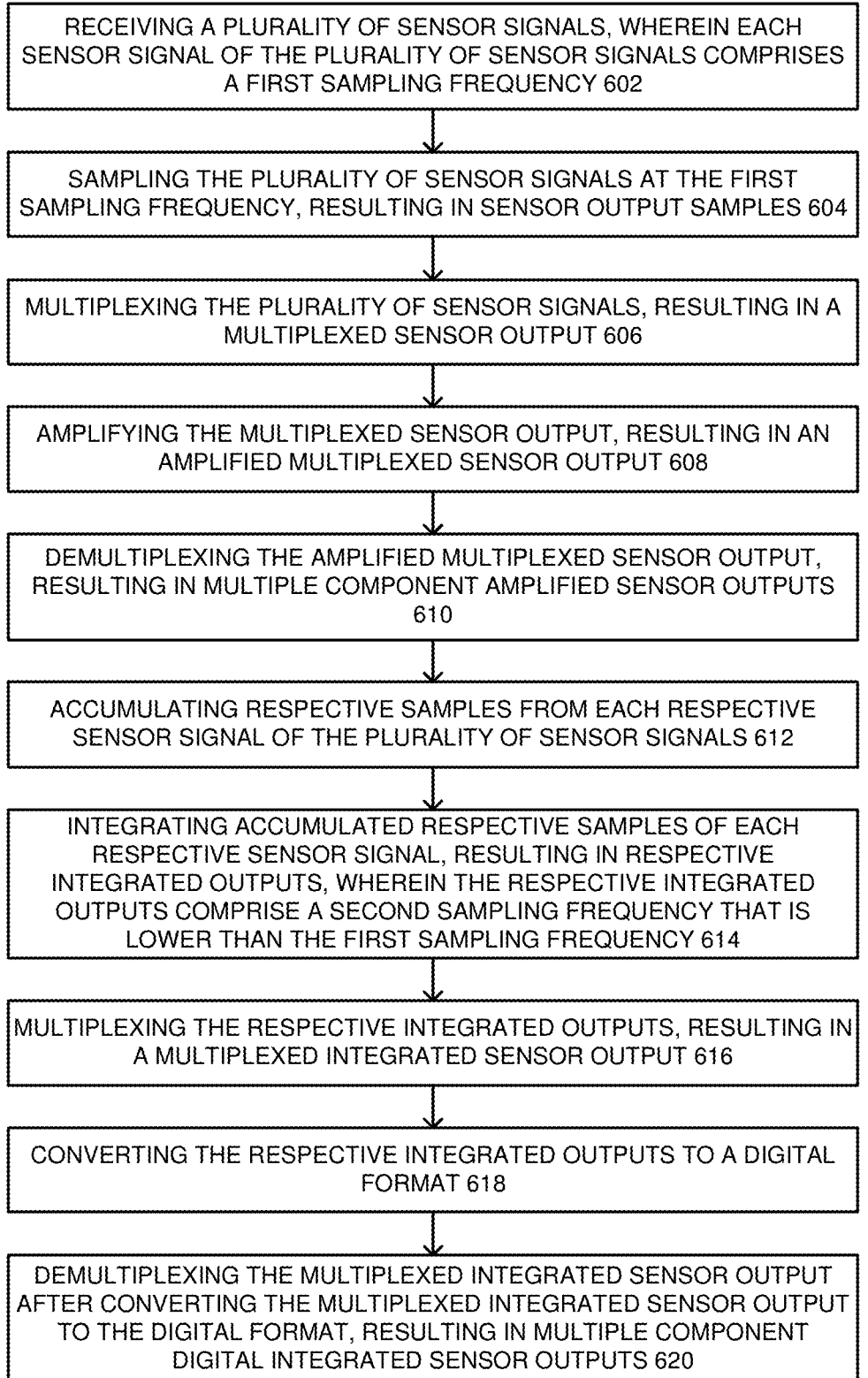

RECEIVING A PLURALITY OF SENSOR SIGNALS, WHEREIN EACH SENSOR SIGNAL OF THE PLURALITY OF SENSOR SIGNALS COMPRISES A FIRST SAMPLING FREQUENCY 602

SAMPLING THE PLURALITY OF SENSOR SIGNALS AT THE FIRST SAMPLING FREQUENCY, RESULTING IN SENSOR OUTPUT SAMPLES 604

MULTIPLEXING THE PLURALITY OF SENSOR SIGNALS, RESULTING IN A MULTIPLEXED SENSOR OUTPUT 606

AMPLIFYING THE MULTIPLEXED SENSOR OUTPUT, RESULTING IN AN AMPLIFIED MULTIPLEXED SENSOR OUTPUT 608

DEMULTIPLEXING THE AMPLIFIED MULTIPLEXED SENSOR OUTPUT, RESULTING IN MULTIPLE COMPONENT AMPLIFIED SENSOR OUTPUTS 610

ACCUMULATING RESPECTIVE SAMPLES FROM EACH RESPECTIVE SENSOR SIGNAL OF THE PLURALITY OF SENSOR SIGNALS 612

INTEGRATING ACCUMULATED RESPECTIVE SAMPLES OF EACH RESPECTIVE SENSOR SIGNAL, RESULTING IN RESPECTIVE INTEGRATED OUTPUTS, WHEREIN THE RESPECTIVE INTEGRATED OUTPUTS COMPRISE A SECOND SAMPLING FREQUENCY THAT IS LOWER THAN THE FIRST SAMPLING FREQUENCY 614

MULTIPLEXING THE RESPECTIVE INTEGRATED OUTPUTS, RESULTING IN A MULTIPLEXED INTEGRATED SENSOR OUTPUT 616

CONVERTING THE RESPECTIVE INTEGRATED OUTPUTS TO A DIGITAL FORMAT 618

DEMULTIPLEXING THE MULTIPLEXED INTEGRATED SENSOR OUTPUT AFTER CONVERTING THE MULTIPLEXED INTEGRATED SENSOR OUTPUT TO THE DIGITAL FORMAT, RESULTING IN MULTIPLE COMPONENT DIGITAL INTEGRATED SENSOR OUTPUTS 620

FIG. 6

SENSOR SIGNAL MULTIPLEXER AND DIGITIZER WITH ANALOG NOTCH FILTER AND OPTIMIZED SAMPLE FREQUENCY

CROSS REFERENCE TO RELATED APPLICATION

This is a nonprovisional claiming priority under 35 U.S.C. § 119 to U.S. Provisional Patent Application No. 63/228,206, filed on Aug. 2, 2021, entitled "Dual Integrator Round Robin." The prior application is incorporated by reference in its entirety.

TECHNICAL FIELD

The subject disclosure generally relates to multi-channel sensors, more particularly, to electronics used to amplify and digitize outputs of multi-channel sensors.

BACKGROUND

Inertial measurement units (IMUs) that provide motion detection in electronic devices such as mobile phones, virtual reality headsets, and other devices, may include a multi-channel motion sensing technologies, wherein different channels are used to sense motion in different directions.

For example, some IMUs include micro electromechanical system (MEMS) sensors, which can detect motion along x, y, and z axes. An example MEMS sensor can include a suspended mass between pairs of capacitive plates. Each pair of capacitive plates is part of a respective sensing channel associated with a respective axis. When tilt or acceleration is applied to the MEMS sensor, movement of the suspended mass creates differences in electric potential, which can be output via the different sensing channels. The outputs of the different MEMS sensing channels can be further processed by the IMU to produce digital outputs that indicate motion.

Electronics for use by IMUs in processing outputs of multi-channel sensors, such as MEMS sensors, can be designed in several ways. In one example approach, dedicated hardware can be allocated to each sensing channel. In another approach, time domain division can allow sharing of hardware across the multiple sensing channels. While allocating dedicated hardware to each sensing channel can lead to optimal performance, sharing hardware across sensing channels can be more cost, power, and space efficient, and can also produce acceptable performance.

Sharing hardware implies signal sampling, which can be done, for example, in a "round robin" approach by sampling each channel in sequence. One problem with the use of round robin sampling in IMUs is vibrational noise. For example, a device that is playing music, or otherwise in an environment with sound vibration, may experience vibrational noise that affects motion detection by its IMU. Other sources of vibration such as vehicle engines, equipment operation, and the like can also affect motion detection. In modern devices and systems, IMUs are subject to many vibrational disturbances, due to components such as speakers and choke inductances that generate substantial vibrations on device electronics.

Round robin architectures are sensitive to vibrational noise interference because of their intrinsic sampled transfer function, which folds the harmonics of the round robin frequency into the baseband. The round robin frequency is commonly in the range of tens of kilohertz (kHz), which is in the same range as many vibrational disturbances. For example, many vibrational disturbances are in the 0-40 kHz range.

One solution to avoid the problem vibrational noise is to avoid the use of round robin architectures in IMUs. Another solution is to increase the overall round robin frequency, including the analog to digital converter (ADC) sampling frequency. However, such solutions have the drawbacks of increased power consumption and design complexity. There is a need for improved approaches to address the problems of vibrational noise in IMUs that use round-robin sampling.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 4 illustrates example timing of signal processing operations by components of the IMU illustrated in FIG. 3, in accordance with various embodiments of this disclosure;

FIG. 6 illustrates an example method to process sensor signals, in accordance with various embodiments of this disclosure.

DETAILED DESCRIPTION

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

One or more aspects of the technology described herein are generally directed towards a sensor signal multiplexer and digitizer with analog notch filter and optimized sample frequency, and corresponding methods of use and manufacture. In some examples, the disclosed technologies can be used to reduce vibration sensitivity of an inertial measurement unit (IMU). The disclosed sensor signal multiplexer can sample sensor inputs on multiple input channels at a first, higher frequency, and integrate samples for each channel in order to generate lower frequency sensor outputs. The lower frequency sensor outputs can be converted to digital form. Further aspects and embodiments are described in detail below.

Figure 1:
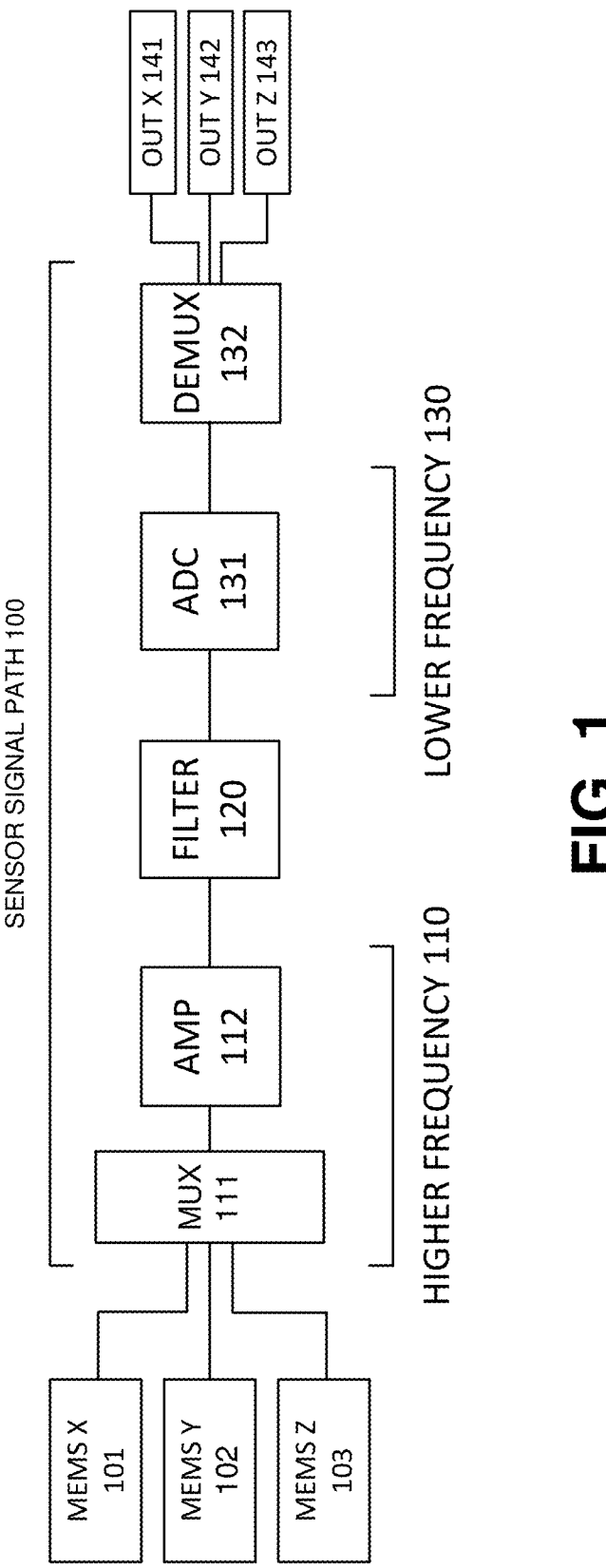
FIG. 1 illustrates example higher frequency and lower frequency portions of a sensor signal path, in accordance with various embodiments of this disclosure.

FIG. 1 illustrates an example sensor signal path comprising higher frequency and lower frequency portions thereof, in accordance with various embodiments of this disclosure. The example sensor signal path 100 comprises a multiplexer 111, an amplifier 112, a filter 120, an analog to digital converter (ADC) 131, and a digital demultiplexer 132. The multiplexer 111 and the amplifier 112 are indicated as operating at a higher frequency 110, while the ADC 131 is indicated as operating at a lower frequency 130. The filter 120 enables the transition from the higher frequency 110 to the lower frequency 130.

The sensor signal path 100 can receive sensor inputs, e.g., sensor inputs from multiple different MEMS channels, which are illustrated as MEMS X 101, MEMS Y 102, and MEMS Z 103. The sensor signal path 100 can output digital sensor outputs such as OUT X 141, OUT Y 142, and OUT Z 143. The output OUT X 141 can comprise a digital version of the input MEMS X 101, and likewise, the output OUT Y 142 can comprise a digital version of the input MEMS Y 102, and the output OUT Z 143 can comprise a digital version of the input MEMS Z 103.

In example operations according to FIG. 1, the multiplexer 111 can receive multiple sensor inputs MEMS X 101, MEMS Y 102, and MEMS Z 103. The multiplexer 111 can sample the multiple sensor inputs MEMS X 101, MEMS Y 102, and MEMS Z 103, e.g., using round-robin sampling, and the multiplexer 111 can produce a multiplexed output comprising a stream of samples from the multiple sensor inputs MEMS X 101, MEMS Y 102, and MEMS Z 103. The multiplexer 111 can perform sampling at the higher frequency 110, and so its output stream of samples can likewise be at the higher frequency 110. The amplifier 112 can amplify the stream of samples produced by the multiplexer 111, thereby producing an amplified stream of samples from the multiple sensor inputs MEMS X 101, MEMS Y 102, and MEMS Z 103. The amplified stream of samples can likewise be at the higher frequency 110.

Figure 2:
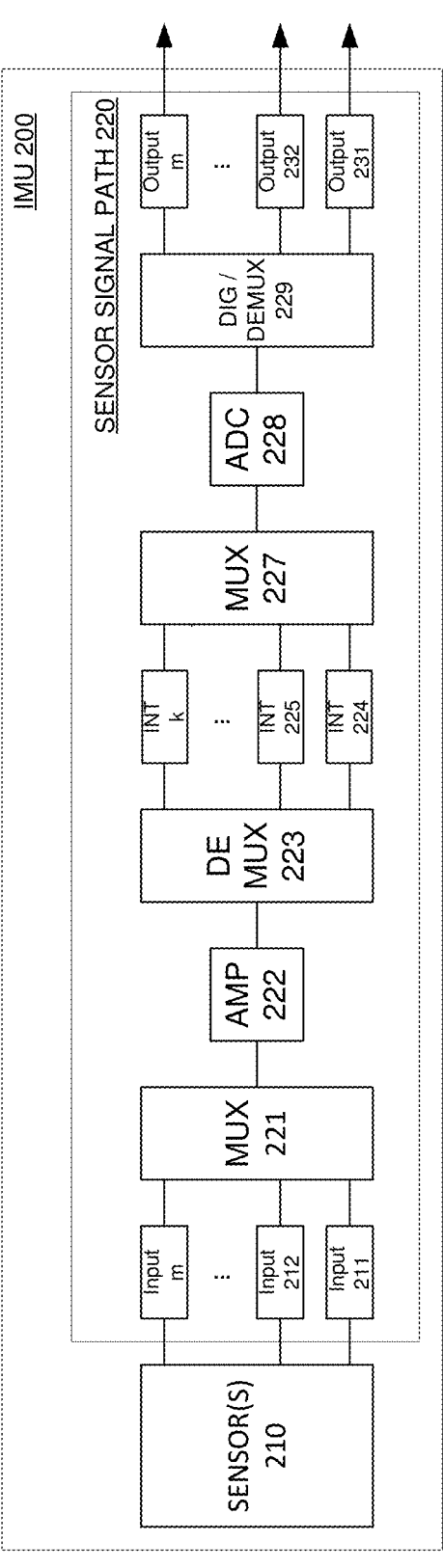
FIG. 2 illustrates an example inertial measurement unit (IMU) comprising a sensor signal path in accordance with various embodiments of this disclosure.
Figure 3:
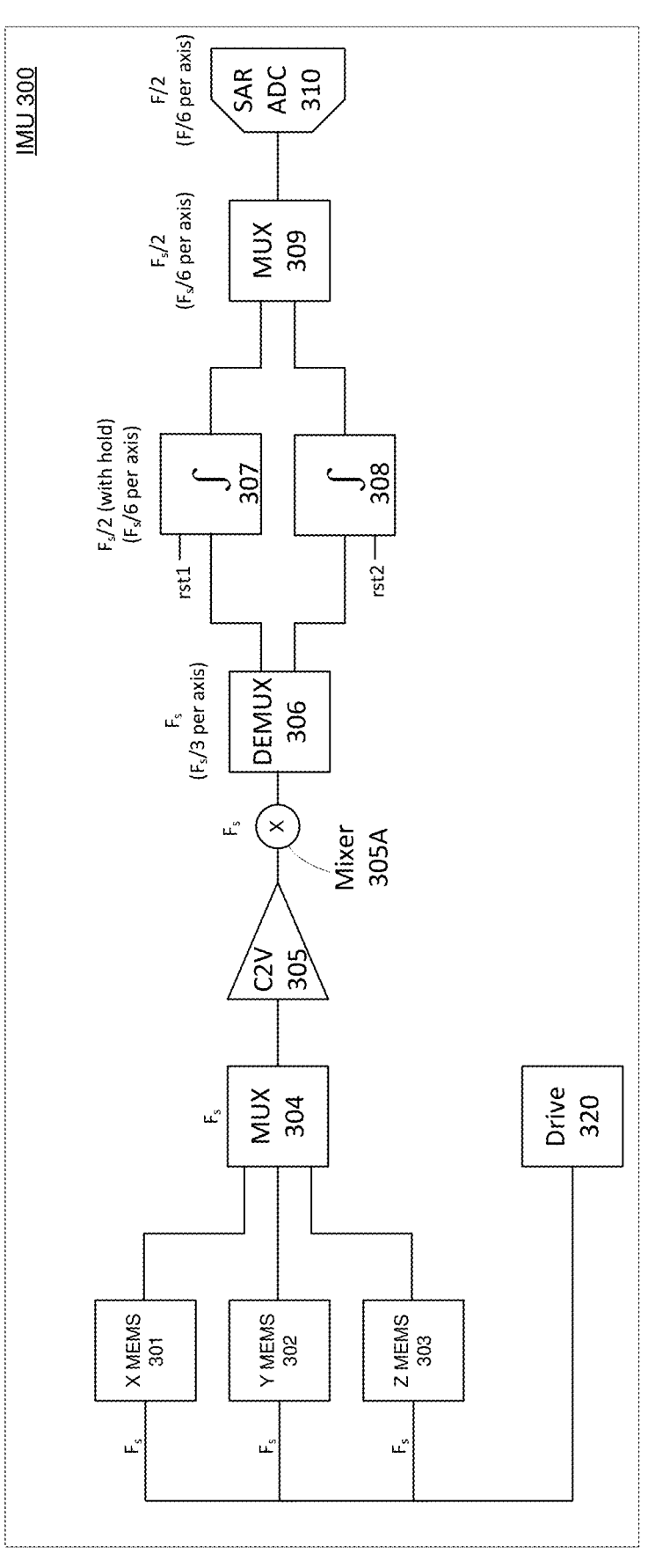
FIG. 3 illustrates an example IMU equipped to use a frequency modulated input signal, in accordance with various embodiments of this disclosure.

The filter 120 can be implemented as illustrated in FIG. 2 and FIG. 3. In general, the filter 120 can use integrators to combine samples associated with each of the respective sensor inputs MEMS X 101, MEMS Y 102, and MEMS Z 103. For example, samples associated with MEMS X 101 can be combined, samples associated with MEMS Y 102 can be combined, and samples associated with MEMS Z 102 can be combined, in a manner that reduces the higher frequency 110 to the lower frequency 130.

The ADC 131 can convert the lower frequency 130 signals enabled by filter 120 to digital form. The demultiplexer 132 can separate the digital output from the ADC 131 into different outputs OUT X 141, OUT Y 142, and OUT Z 143, which correspond to the different inputs MEMS X 101, MEMS Y 102, and MEMS Z 103, as noted above. The different outputs OUT X 141, OUT Y 142, and OUT Z 143 can be used for example by a device that incorporates the illustrated sensor signal path 100, in order to determine motion of the device.

In an aspect, the disclosed solution comprises an analog chain which allows the use of two different frequencies, a higher frequency 110 for the input channel MUX 111, and a lower frequency 130 for the ADC 131, without incurring folding issues that can occur in the ADC 131. Using the disclosed sensor signal path 100, it is possible to take advantage of a low-speed ADC 131 which can have lower power consumption and easier design flow than a high-speed ADC. Furthermore, the disclosed sensor signal path 100 can avoid problems of vibrational noise, because the higher frequency 110 can comprise a frequency that is above the typical environmental noise experienced by devices in the field. The disclosed sensor signal path 100 therefore enables the use of a round-robin architecture which can perform as well as three-channel solutions which use dedicated hardware for each of the inputs MEMS X 101, MEMS Y 102, and MEMS Z 103 rather than round-robin sampling, as employed by the sensor signal path 100.

FIG. 2 illustrates an example inertial measurement unit (IMU) comprising a sensor signal path in accordance with various embodiments of this disclosure. The example IMU 200 includes sensor(s) 210 and a sensor signal path 220. The sensor(s) 210 can output multiple sensor outputs, which are received at sensor signal path 220 as inputs 211, 212 . . . m. The sensor signal path 220 comprises a multiplexer 221, an amplifier 222, a demultiplexer 223, integrators 224, 225 . . . k, a multiplexer 227, an ADC 228, and a digital processor/demultiplexer 229. The sensor signal path 220 can output digital outputs 231, 232 . . . m, which correspond to the inputs 211, 212 . . . m.

Embodiments according to FIG. 2 can generally operate as described above in connection with FIG. 1. FIG. 2 illustrates an example structure of the filter 120 introduced in FIG. 1. The filter 120 can be implemented for example via demultiplexer 223, integrators 224, 225 . . . k, and multiplexer 227. Furthermore, FIG. 2 illustrates a more generic embodiment in which the sensor(s) 210 need not necessarily be implemented as MEMS sensors, and the number of input channels is not constrained. In general, any number (m) of input channels can be processed by the sensor signal path 220, using a number of integrators (k) which can be fewer than the number (m) of input channels. The number (m) of output channels can be the same as the number (m) of input channels.

Operations according to FIG. 2 can comprise, e.g., in addition to the operations described above with reference to FIG. 1, demultiplexing, by the demultiplexer 223, the amplified input stream which is output from the amplifier 222. The demultiplexer 223 can provide demultiplexed outputs to each of the integrators 224, 225 . . . k. Each of the integrators 224, 225 . . . k can be configured to combine demultiplexed outputs received from the demultiplexer 223, to output the resulting combinations to the multiplexer 227, and to then reset, in order to begin a new combination of demultiplexed outputs received from the demultiplexer 223. The timing of the integrators 224, 225 . . . k can be implemented such that samples associated with each respective input 211, 212 . . . m are combined by an integrator 224, 225 . . . k prior to reset of the integrator.

In an example embodiment according to FIG. 2, a sensor signal path 220 can comprise a multiplexer 221 configured to receive a plurality of sensor signals, e.g., inputs 211, 212 . . . m, at a first sample frequency (the higher frequency 110), wherein the multiplexer 221 generates a multiplexed output. The plurality of sensor signals 211, 212 . . . m can be generated by a plurality of sensors 210, and the plurality of sensors 210 can comprise a number of sensors that is more than the total number k of integrators 224, 225 . . . k.

An amplifier 222 can be coupled between the multiplexer 221 and the demultiplexer 223, wherein the amplifier 222 is configured to amplify the multiplexed output from the multiplexer 221. The demultiplexer 223 can be configured to demultiplex the multiplexed output from the multiplexer 221 and amplifier 222, resulting in a plurality of demultiplexed sensor signals. The multiplexer 221, amplifier 222, and demultiplexer 223 can be configured to operate at the first sample frequency (the higher frequency 110).

The plurality of integrators 224, 225 . . . k can comprise a total number k of integrators that is less than or equal to the total number m of sensor signals of the plurality of sensor signals 211, 212 . . . m. The plurality of integrators 224, 225 . . . k can be configured to accumulate samples of the plurality of demultiplexed sensor signals (output from demultiplexer 223), and to generate integrated outputs. Each respective integrator of the plurality of integrators 224, 225 . . . k can be configured to reset after accumulating a number of the samples, as described in connection with FIG. 4.

A second multiplexer 227 can be coupled between the plurality of integrators 224, 225 . . . k and the ADC 228, wherein the second multiplexer 227 can be configured to multiplex the integrated outputs of the plurality of integrators 224, 225 . . . k. The ADC 228 can be configured to generate a digital signal based on samples of the integrated outputs of the plurality of integrators 224, 225 . . . k, wherein the digital signal comprises a second sample frequency (the lower frequency 130) that is lower than the first sample frequency 110, and wherein the second sample frequency 130 can for example be equal to the first sample frequency 110 divided by a number of samples accumulated by an integrator of the plurality of integrators 224, 225 . . . k prior to resetting the integrator. The plurality of integrators 224, 225 . . . k and the ADC 228 can be configured to operate at the second frequency 130. A demultiplexer 229 can be configured to sample the digital signal output from ADC 228 and output the digital signal via separate channels, e.g., outputs 231, 232 . . . m, wherein each of the separate channels 231, 232 . . . m corresponds to a sensor signal of the plurality of sensor signals 211, 212 . . . m.

In another embodiment which can be understood by reference to FIG. 2, the sensor signal path 220 can comprise a sensor signal multiplexer and digitizer, which can be included, e.g., within an IMU 200. The IMU 200 can further comprise multiple MEMS sensors, e.g., sensors 210, each MEMS sensor comprising a respective sensor output connection to produce sensor outputs (received as inputs 211, 212 . . . m). The IMU 200 can be adapted for deployment in a mobile device, an augmented reality or virtual reality headset, a vehicle, or other equipment.

The sensor signal path 220 comprises a sensor signal multiplexer 221 comprising multiple sensor signal multiplexer 221 input connections and a sensor signal multiplexer 221 output connection, wherein the multiple sensor signal multiplexer 221 input connections are couplable with multiple sensor 210 output connections in order to receive multiple sensor outputs 211, 212 . . . m. The sensor signal multiplexer 2221 can be configured to sample the multiple sensor outputs 211, 212 . . . m and to output resulting samples via the sensor signal multiplexer 221 output connection. The sensor signal multiplexer 221 can be configured to use round-robin sampling to sample the multiple sensor outputs 211, 212 . . . m. The sensor signal multiplexer 221 can be configured to sample the multiple sensor outputs 211, 212 . . . m at a first frequency 110. The multiple sensor outputs 211, 212 . . . m can comprise frequency modulated signals as shown in FIG. 3.

A signal amplifier 222 can comprise a signal amplifier 222 input connection and a signal amplifier 222 output connection, wherein the signal amplifier 222 input connection is coupled with the input multiplexer 221 output connection. A demultiplexer 223 can comprise a demultiplexer 223 input connection and multiple demultiplexer 223 output connections, wherein the demultiplexer 223 input connection is coupled with the signal amplifier 222 output connection.

Multiple integrators 224, 225 . . . k can be included, each integrator comprising a respective integrator input connection, e.g., respective integrator 224 input connection, and a respective integrator output connection, e.g., respective integrator 224 output connection, wherein each respective integrator input connection is coupled with a respective demultiplexer 223 output connection of the multiple demultiplexer 223 output connections.

An integrator multiplexer 227 can comprise multiple integrator multiplexer 227 input connections and an integrator multiplexer 227 output connection, wherein each respective integrator multiplexer 227 input connection is coupled with a respective integrator output connection, e.g., respective integrator 224 output connection. The integrator multiplexer 227 can be configured to output, via the integrator multiplexer 227 output connection, an integrator multiplexer 227 output having a second frequency, wherein the first frequency 110 is higher than the second frequency 130.

An ADC 228 can comprise an ADC 228 input connection and an ADC 228 output connection, wherein the ADC 228 input connection is coupled with the integrator multiplexer 227 output connection, and wherein the ADC 228 is configured to produce a digital output comprising a digitized version of the multiple sensor outputs 211, 212 . . . m. In some embodiments, either the sensor signal path 220 or the IMU 200 can further comprise a digital demultiplexer 229 comprising a digital demultiplexer 229 input connection and multiple digital demultiplexer 229 output connections for outputs 231, 232 . . . m, wherein the digital demultiplexer 229 input connection is coupled with the ADC 228 output connection.

FIG. 3 illustrates an example IMU equipped to use a frequency modulated input signal, in accordance with various embodiments of this disclosure. FIG. 3 comprises sensors X MEMS 301, Y MEMS 302, and Z MEMS 303. A drive 320 provides a frequency modulated input signal. The sensors 301, 302, and 303 are coupled with a multiplexer 304, which is coupled with an amplifier (C2V) 305. The amplifier 305 is coupled with a demultiplexer 306, which is coupled with integrators 307, 308. The integrators 307, 308 are coupled with a multiplexer 309, which is in turn coupled with a successive approximation register analog to digital converter (SAR ADC) 310. A drive 320 provides a modulated input signal which drives the sensors X MEMS 301, Y MEMS 302, and Z MEMS 303.

In FIG. 3, the example frequency modulated input signal is at 153.6 kHz. The sensors 301, 302, and 303, the multiplexer 304, the amplifier 305, and the demultiplexer 306 can operate at the frequency of the frequency modulated input signal. The integrators 307, 308, the multiplexer 309, and the SAR ADC 310 can operate at the lower frequency, as shown. The integrators 307, 308 can reset according to reset signals, received as rst1 and rst2.

In general, operations according to FIG. 3 can comprise sampling, by the input multiplexer 304, a number "m" of multiple inputs (where m=3 in FIG. 3) at a sampling frequency $F_s$. The signal amplifier 305 can receive the multiplexed output of the input multiplexer 304 and amplify it. The demultiplexer 306 can receive the amplified signal from the amplifier 305 and can alternatingly route the amplified signal to integrators of the set of integrators 307, 308.

The set of integrators 307, 308 can comprise a number "k" of integrators, with k≤m (where k=2 in FIG. 3). In other words, the number k of integrators can be equal to or less than the number m of inputs. Each integrator 307, 308 can accumulate a finite number "n" of samples before being reset, where n>1. The accumulation of the finite number "n" of samples effects a notch filter whose notch frequency is set to $F_s/(n*m)$, as further illustrated in FIG. 5.

Figure 4:
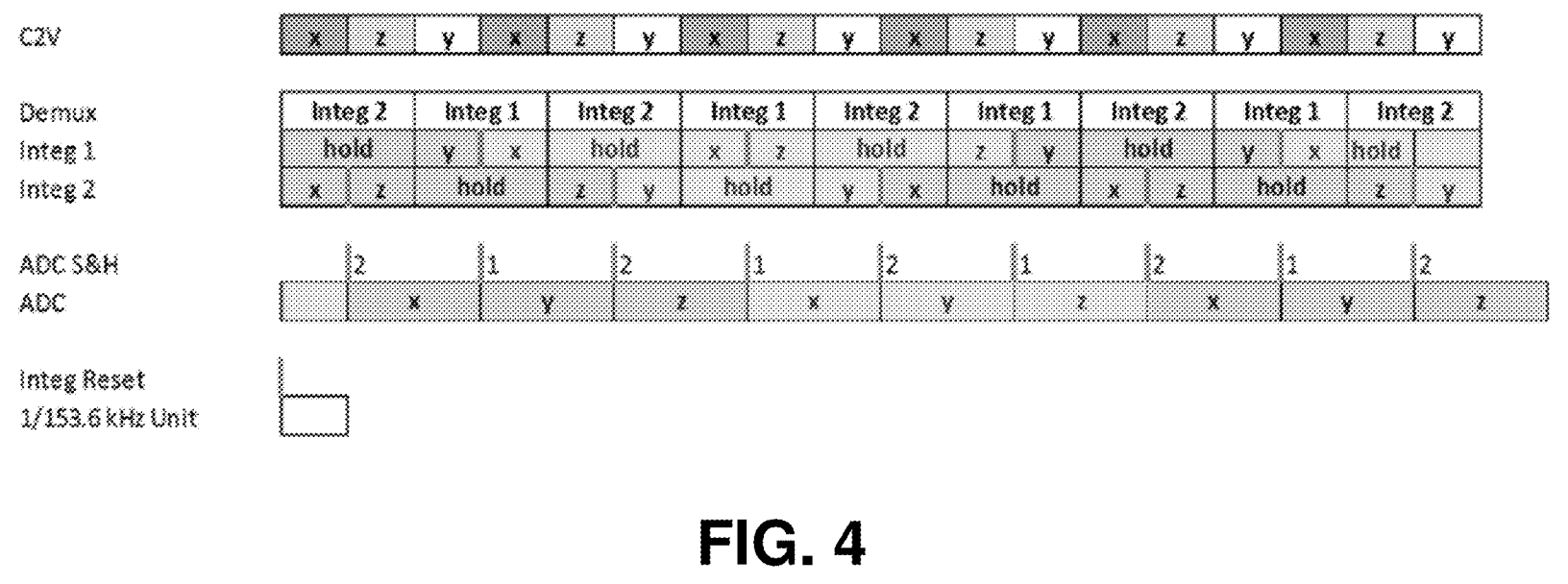

The multiplexer 309 can optionally be implemented by an ADC in some embodiments. The multiplexer 309 can sample the "k" integrator outputs at a sampling frequency of $F_s/n$, with a sequence such as illustrated in FIG. 4. The SAR ADC 310 can comprise a digital demultiplexer configured to split the stream output of the multiplexer 309 into "m" separated channels, wherein each of the output channels corresponds to an input of the "m" inputs.

The embodiment illustrated in FIG. 3 can implement an analog signal path of a high-performance accelerometer. FIG. 3 uses m=3 channels, corresponding to X, Y and Z acceleration axes, which are sampled through an input multiplexer 304 at $F_s$=153.6 kHz (51.2 kHz per axis), and then amplified with a charge amplifier (C2V) 305. The input signal is modulated at 153.6 kHz, thus after C2V 305, a mixer 305A can be used to demodulate the signal in baseband. In FIG. 3, k=2 integrators are used, and each of them sums n=2 samples of each channel before being reset.

Figure 5:
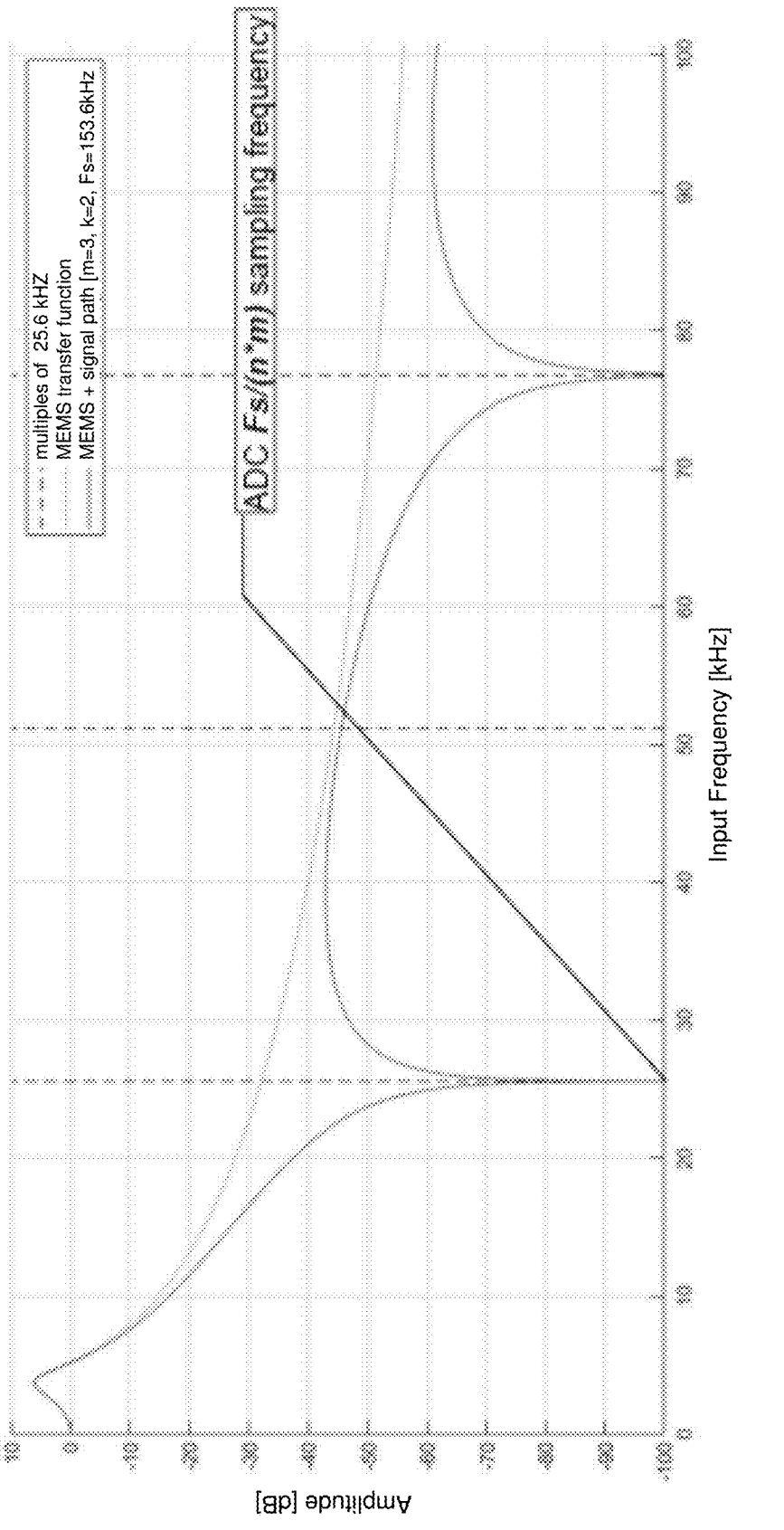
FIG. 5 illustrates an example MEMS transfer function with an additional notch added by a sensor signal path in accordance with various embodiments of this disclosure.

Due to the accumulation process, the integrators introduce a notch at $F_s/(m*n)$=153.6 kHz/(2*3)=25.6 kHz in each channel's transfer function, as illustrated in FIG. 5. The SAR ADC 310 samples the signals coming from the two integrators at 76.8 kHz, corresponding to 25.6 kHz per channel. A digital demultiplexer can split the ADC stream at 76.8 kHz in three different streams at 25.6 kHz, corresponding to X, Y and Z axes.

FIG. 4 illustrates example timing of signal processing operations by components of the IMU illustrated in FIG. 3, in accordance with various embodiments of this disclosure. FIG. 4 includes rows and columns. The columns are arranged in a time sequence according to timing of input samples, wherein an example time unit is illustrated in the bottom row. The rows show operations of various different components, including the C2V 305, the demultiplexer 306, the integrator "1" (i.e., the integrator 307), the integrator "2" (i.e. the integrator 308), an ADC sample and hold component that can implement the multiplexer 309, and the ADC 310.

FIG. 4 illustrates output of the C2V 305 as a stream of amplified samples comprising, from right to left, a sample from input x (X MEMS 301), followed by a sample from input z (Z MEMS 303), followed by a sample from input y (Y MEMS 302), and further repetitions of the x, z, y sample sequence. The demultiplexer 306 sends two of the samples from the C2V 305 to integrator 2 308, followed by sending two samples to the integrator 1 307, and further repetitions of the alternation between integrator 2 308 and integrator 1 307.

Each of the integrators 308 and 307 is illustrated as alternatingly receiving samples from the demultiplexer 306, followed by being on "hold" while the other integrator receives its samples from the demultiplexer 306. Thus, for example, the integrator 1 307 is on hold while integrator 2 308 receives a sample x, followed by a sample z. The integrator 1 307 then receives a sample y followed by a sample x. The integrator 1 307 then goes on hold while integrator 2 308 receives a sample z, followed by a sample y, and so on as illustrated.

Integrator resets are illustrated in the ADC S&H row. The ADC S&H row illustrates an initial reset of integrator 2 308. The integrator 2 308 can output its accumulated x samples to the ADC 310, and reset. Following the reset of integrator 2 308, the integrator 2 308 begins accumulating z samples, as illustrated in the integrator 2 308 row. The ADC S&H row illustrates a next reset of integrator 1 307. The integrator 1 307 can output its accumulated y samples to the ADC 310, and reset. Following the reset of integrator 1 307, the integrator 1 307 begins accumulating x samples, as illustrated in the integrator 1 307 row. The ADC S&H row illustrates a next reset of integrator 2 308. The integrator 2 308 can output its accumulated z samples to the ADC 310, and reset. Following the reset of integrator 2 308, the integrator 2 308 begins accumulating y samples, as illustrated in the integrator 2 308 row. Thus, each of the integrators accumulates samples from a given sensor input, then outputs those samples, and resets. FIG. 4 illustrates an embodiment comprising two integrators; however the example can be extended to the use of additional integrators if desired.

FIG. 5 illustrates an example MEMS transfer function with an additional notch added by a sensor signal path in accordance with various embodiments of this disclosure. FIG. 5 is a graph showing amplitude, in decibels (dB) on the vertical axis and input frequency, in kHz, on the horizontal axis. Dashed vertical lines illustrate intervals of 25.6 kHz. The MEMS transfer function is the smooth upper line plotted on the graph. MEMS plus signal path shows the effect of using a signal path such as illustrated in FIG. 3, with three inputs (m=3), two integrators (k=2), and a sampling frequency $F_s$ of 153.6 kHz.

FIG. 6 illustrates an example method to process sensor signals, in accordance with various embodiments of this disclosure. For simplicity of explanation, the illustrated method is depicted and described as a series of acts. It is to be understood and appreciated that various embodiments disclosed herein need not be limited by the acts illustrated and/or by the order of acts. For example, acts can occur in various orders and/or concurrently, and with other acts not presented or described herein. Furthermore, not all illustrated acts may be required to implement methodologies in accordance with the disclosed subject matter. In addition, those skilled in the art will understand and appreciate that the methods illustrated herein could alternatively be represented as a series of interrelated states via a state diagram or events.

The operations illustrated in FIG. 6 can be performed, e.g., by a signal path 220 such as illustrated in FIG. 2. At 602, the multiplexer 221 can receive a plurality of sensor signals, e.g., inputs 211, 212 . . . m wherein each sensor signal of the plurality of sensor signals 211, 212 . . . m comprises a first sampling frequency, such as the frequency illustrated in FIG. 3. The plurality of sensor signals 211, 212 . . . m can be received from sensors 210, e.g., microelectromechanical system (MEMS) sensors as illustrated in FIG. 3.

At 604, the multiplexer 221 can sample the plurality of sensor signals 211, 212 . . . m at the first sampling frequency, resulting in sensor output samples. Sampling the plurality of sensor signals 211, 212 . . . m can comprise round-robin sampling. At 606, the multiplexer 221 can multiplex the plurality of sensor signals 211, 212 . . . m, resulting in a multiplexed sensor output. At 608, the amplifier 222 can amplify the multiplexed sensor output, resulting in an amplified multiplexed sensor output.

At 610, the demultiplexer 223 can demultiplex the amplified multiplexed sensor output (from amplifier 222), resulting in multiple component amplified sensor outputs. The demultiplexer 223 can alternatingly send component amplified sensor outputs to integrators 224, 225 . . . k, as illustrated in FIG. 4.

At 612, the integrators 224, 225 . . . k can accumulate respective samples from each respective sensor signal of the plurality of sensor signals 211, 212 . . . m. Accumulating respective samples from each respective sensor signal of the plurality of sensor signals 211, 212 . . . m can comprise accumulating respective samples from the multiple component amplified sensor outputs, i.e., the outputs of the demultiplexer 223.

At 614, the integrators 224, 225 . . . k can integrate accumulated respective samples of each respective sensor signal 211, 212 . . . m, resulting in respective integrated outputs, wherein the respective integrated outputs comprise a second sampling frequency that is lower than the first sampling frequency, e.g., as can be understood by reference to FIG. 4.

At 616, the multiplexer 227 can multiplex the respective integrated outputs, resulting in a multiplexed integrated sensor output. At 618, the ADC 228 can convert the respective integrated outputs to a digital format. Converting the respective integrated outputs to the digital format can comprise converting the multiplexed integrated sensor output, from multiplexer 227, to the digital format. At 620, the demultiplexer 229 can demultiplex the multiplexed integrated sensor output after converting (by the ADC 228) the multiplexed integrated sensor output to the digital format, resulting in multiple component digital integrated sensor outputs 231, 232 . . . m.

Another example method, which can also be understood by reference to FIG. 2, can comprise a sensor signal multiplexer and digitizer method, such as may be performed by an IMU. The IMU can be adapted for deployment, e.g., in a mobile device, an augmented reality or virtual reality headset, or a vehicle. The example method can comprise sampling, by the multiplexer 221, outputs of multiple sensors 210, resulting in sensor output samples. The multiple sensors 210 can comprise, e.g., MEMS sensors. The outputs of the multiple sensors 210 can comprise frequency modulated signals. Sampling the outputs of the multiple sensors 210 can comprise round-robin sampling. Furthermore, sampling the outputs of the multiple sensors 210 can be performed at a first frequency, e.g., the higher frequency 110 illustrated in FIG. 1.

The example method can comprise multiplexing, by the multiplexer 221, the sensor output samples, resulting in a multiplexed sensor output from the multiplexer 221. The example method can furthermore comprise amplifying, by the amplifier 222, the multiplexed sensor output from the multiplexer 221, resulting in an amplified multiplexed sensor output.

The example method can furthermore comprise demultiplexing, by the demultiplexer 223, the amplified multiplexed sensor output from the amplifier 222, resulting in multiple component amplified sensor outputs from the demultiplexer 223. The example method can furthermore comprise integrating, by the integrators 224, 225 . . . k, each of the multiple component amplified sensor outputs from the demultiplexer 223, resulting in multiple component integrated sensor outputs from the integrators 224, 225 . . . k. Integrating each of the multiple component amplified sensor outputs from the integrators 224, 225 . . . k can comprise resetting an integrator, accumulating, by the integrator, multiple samples included within a component amplified sensor output, resulting in accumulated samples, and outputting, by the integrator, the accumulated samples.

The example method can furthermore comprise multiplexing, by the multiplexer 227, the multiple component integrated sensor outputs from the integrators 224, 225 . . . k, resulting in a multiplexed integrated sensor output from the multiplexer 227. The multiplexed integrated sensor output can have a second frequency, e.g., the higher frequency 130 illustrated in FIG. 1, wherein the first frequency 110 is higher than the second frequency 130.

The example method can furthermore comprise performing, by: ADC 228, an analog to digital conversion of the multiplexed integrated sensor output from the multiplexer 227, resulting in a digital integrated sensor output from the ADC 228. The digital integrated sensor output from the ADC 228 can comprise a digital multiplexed integrated sensor output. The example method can furthermore comprise demultiplexing, by the demultiplexer 229, the digital multiplexed integrated sensor output from the ADC 228, resulting in multiple component digital integrated sensor outputs 231, 232 . . . m.

As employed in the subject specification, the term "component" refers to substantially any analog and/or digital based device(s), circuit(s), etc. comprising, e.g., a resistor, a capacitor, a transistor, a diode, an inductor, a memory, a programmable device, e.g., fuse, field programmable gate array (FPGA), complex programmable logic device (CPLD), etc. relevant to performing operations and/or functions of circuit(s), device(s), system(s), etc. disclosed herein. Further, the terms "processing component", "control unit component", "control unit", and "arithmetic logic unit (ALU)" can refer to substantially any computing processing unit or device (e.g., MAC, etc.), comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an ASIC, a digital signal processor (DSP), an FPGA, a programmable logic controller (PLC), a CPLD, a discrete gate or transistor logic, discrete hardware components, an analog circuit, or any combination thereof designed to perform the functions and/ or processes described herein. Further, a processor can exploit nano-scale architectures such as, but not limited to, molecular and quantum-dot based transistors, switches and gates, e.g., in order to optimize space usage or enhance performance of mobile devices. A processor can also be implemented as a combination of computing processing units, devices, etc.

In the subject specification, the term "memory", "memory component", "lookup table (LUT)" and substantially any other information storage component relevant to operation and functionality of devices disclosed herein refer to "memory components," or entities embodied in a "memory," or components comprising the memory. It will be appreciated that the memory can include volatile memory and/or nonvolatile memory. By way of illustration, and not limitation, volatile memory, can include random access memory (RAM), which can act as external cache memory. By way of illustration and not limitation, RAM can include synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM). In other embodiment(s) nonvolatile memory can include read only memory (ROM), programmable ROM (PROM), electrically programmable ROM (EPROM), electrically erasable ROM (EEPROM), or flash memory. Additionally, the components and/or devices disclosed herein can comprise, without being limited to comprising, these and any other suitable types of memory.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Aspects of systems, apparatus, devices, processes, and process blocks explained herein can be embodied within hardware, such as an ASIC or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The above description of illustrated embodiments of the subject disclosure is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A sensor signal path, comprising:
a multiplexer configured to operate at a first operating frequency and receive a plurality of sensor signals at a first sample frequency, wherein the multiplexer generates a multiplexed output;
a demultiplexer configured to demultiplex the multiplexed output, resulting in a plurality of demultiplexed sensor signals;
a plurality of integrators comprising a total number of integrators that is less than or equal to a total number of sensor signals of the plurality of sensor signals, wherein the plurality of integrators is configured to accumulate samples of the plurality of demultiplexed sensor signals, and to generate integrated outputs; and
an analog to digital converter configured to operate at a second operating frequency and generate a digital signal based on samples of the integrated outputs of the plurality of integrators, wherein the second operating frequency is lower than the first operating frequency, wherein the digital signal comprises a second sample frequency that is lower than the first sample frequency, wherein the second sample frequency is equal to the first sample frequency divided by a number of samples accumulated by an integrator of the plurality of integrators prior to resetting the integrator,
wherein the plurality of integrators and the analog to digital converter are configured to operate at the second operating frequency, wherein each of the plurality of integrators comprises a notch filter, wherein a notch frequency of the notch filter is a function of the second sample frequency divided by a number of output channels associated with the analog to digital converter, and wherein the number of output channels is at least two.

2. The sensor signal path of claim 1, wherein the demultiplexer is a first demultiplexer, and wherein the sensor signal path further comprises a second demultiplexer configured to sample the digital signal and output the digital signal via separate output channels, wherein each of the separate output channels corresponds to a sensor signal of the plurality of sensor signals.

3. The sensor signal path of claim 1, further comprising an amplifier coupled between the multiplexer and the demultiplexer, wherein the amplifier is configured to amplify the multiplexed output.

4. The sensor signal path of claim 1, wherein demultiplexer is a first demultiplexer, and wherein the sensor signal path further comprises a second multiplexer coupled between the plurality of integrators and the analog to digital converter, wherein the second multiplexer is configured to multiplex the integrated outputs of the plurality of integrators.

5. The sensor signal path of claim 1, wherein the multiplexer and the demultiplexer are configured to operate at the first operating frequency.

6. The sensor signal path of claim 1, wherein the notch frequency of the notch filter facilitates reducing vibration sensitivity of a sensor associated with the sensor signal path.

7. The sensor signal path of claim 1, wherein each respective integrator of the plurality of integrators is configured to reset after accumulating the number of the samples.

8. The sensor signal path of claim 1, wherein the plurality of sensor signals are generated by a plurality of sensors, and wherein the plurality of sensors comprises a number of sensors that is more than the total number of integrators.

9. A method to process sensor signals, comprising:
receiving, by a multiplexer operating at a first operating frequency, a plurality of sensor signals, wherein each respective sensor signal of the plurality of sensor signals comprises a first sampling frequency;

accumulating respective samples from each respective sensor signal of the plurality of sensor signals;

integrating accumulated respective samples of each respective sensor signal, resulting in respective integrated outputs, wherein the respective integrated outputs comprise a second sampling frequency that is lower than the first sampling frequency; and converting, by an analog to digital converter operating at a second operating frequency, the respective integrated outputs to a digital format to generate respective digital output data that is output via respective output channels, wherein the second operating frequency is lower than the first operating frequency, wherein each output channel of the respective output channels is associated with a notch filter, wherein a notch frequency of the notch filter is a function of the first sampling frequency, a number of the respective samples accumulated from one of the respective sensor signals, based on the accumulating, prior to an integration reset, and a number of the respective output channels, and wherein the number of the respective output channels is at least two.

10. The method to process sensor signals of claim 9, further comprising sampling the plurality of sensor signals at the first sampling frequency, resulting in sensor output samples.

11. The method to process sensor signals of claim 10, wherein the sampling of the plurality of sensor signals comprises round-robin sampling of the plurality of sensor signals.

12. The method to process sensor signals of claim 10, further comprising multiplexing the plurality of sensor signals, resulting in a multiplexed sensor output.

13. The method to process sensor signals of claim 12, further comprising amplifying the multiplexed sensor output, resulting in an amplified multiplexed sensor output.

14. The method to process sensor signals of claim 13, further comprising demultiplexing the amplified multiplexed sensor output, resulting in multiple component amplified sensor outputs, and wherein the accumulating of the respective samples from each respective sensor signal of the plurality of sensor signals comprises accumulating the respective samples from the multiple component amplified sensor outputs.

15. The method to process sensor signals of claim 9, further comprising multiplexing the respective integrated outputs, resulting in a multiplexed integrated sensor output, and wherein the converting of the respective integrated outputs to the digital format comprises converting the multiplexed integrated sensor output to the digital format.

16. The method to process sensor signals of claim 15, further comprising demultiplexing the multiplexed integrated sensor output after the converting of the multiplexed integrated sensor output to the digital format, resulting in multiple component digital integrated sensor outputs that comprises the respective digital output data.

17. The method to process sensor signals of claim 9, wherein the plurality of sensor signals are received from microelectromechanical system (MEMS) sensors.

18. The method to process sensor signals of claim 9, wherein the notch frequency of the notch filter facilitates reducing vibration sensitivity of a sensor associated with the sensor signals.

* * * * *